March 13, 1934.  E. G. SCHULTZ  1,950,751
FENCE POST
Filed Feb. 20, 1933
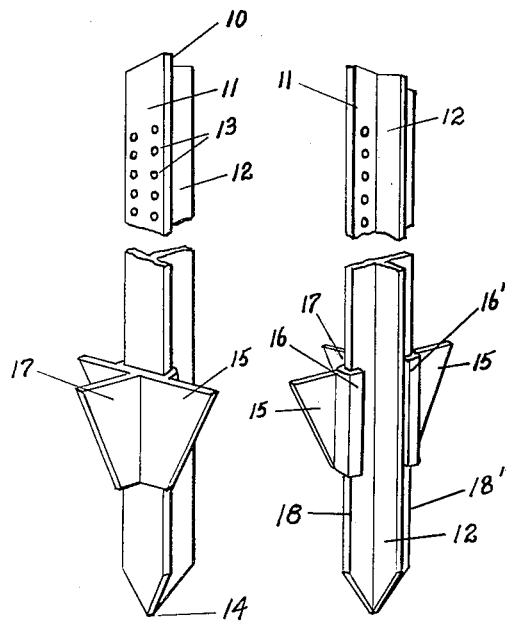
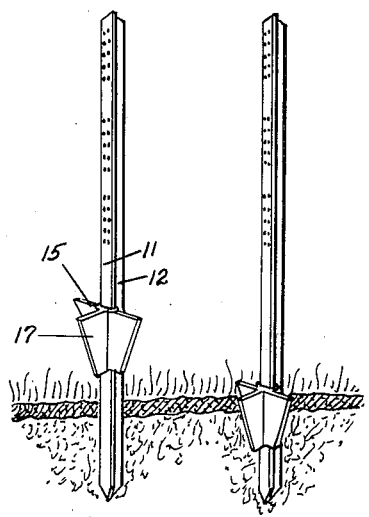
Fig.1  Fig.2  Fig.3  Fig.4
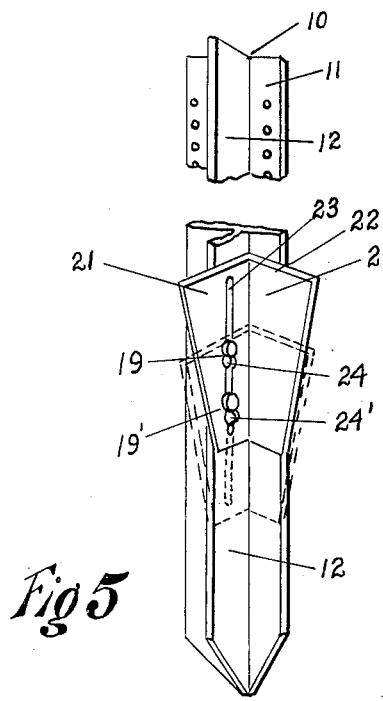
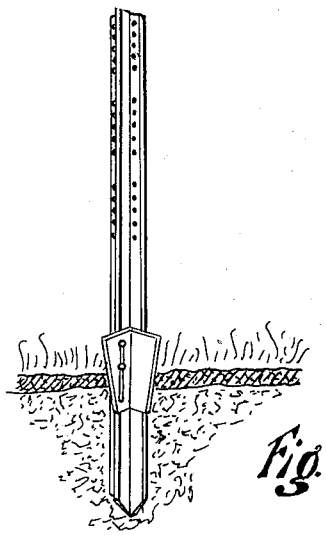
Fig.5  Fig.6
INVENTOR
Emil G. Schultz
BY Gerald P. Welch
ATTORNEY Patented Mar. 13, 1934

1,950,751

UNITED STATES PATENT OFFICE 1,950,751

FENCE POST

Emil G. Schultz, Milwaukee, Wis., assignor of one-half to Walter F. Matthews, Milwaukee, Wis.

Application February 20, 1933, Serial No. 657,526

1 Claim. (Cl. 189—29)

This invention relates to fence-posts, and more particularly to a fence-post of the type having a base plate or reinforcing member attached thereto.

An object of the invention is to provide a fence post having a base plate which may be conveniently attached in sliding engagement therewith after the post is driven, and in its turn driven into the ground as a reinforcement for the post.

Another object is to provide a base plate of a structure adapted for easy entrance into the ground.

Another object is to provide an economical and simple structure of great practical utility.

Other and further objects will appear as the description proceeds, and will be more readily understood from a perusal of the following specification, reference being had to the accompanying drawing, in which:

Fig. 1 is a fragmentary view in front perspective of a fence-post and base plate embodying my invention.

Fig. 2 is a fragmentary rear view in perspective of a fence-post with the novel base plate attached.

Fig. 3 is a front perspective view of a fence post driven into the ground with the base plate attached preparatory to being driven.

Fig. 4 is a front view in perspective of the fence-post and base plate showing placement of the base plate after it has been driven.

Fig. 5 is a fragmentary view in perspective showing a modified form of my invention.

Fig. 6 is a perspective view of a fence-post with the modified form of base plate showing the latter partially driven into the ground.

Referring more particularly to the drawing, the numeral 10 refers generally to the fence-post, consisting of a bar 11, having an integral longitudinal rib 12, and forming the usual T structure. The bar 11 carries means 13 for securing fence wires, said means taking any form desired. The post 10 is brought to a point at 14 for easy entry into the ground.

A ground plate 15 is provided with flanges 16 and 16' adapted to freely slidingly engage said plate 15 with the bar 11. The plate 15 has a wing 17 disposed at right angles to the plate proper and integral therewith. The plate 15 and wing 17 have edges converging downwardly, and the base plate may thus be driven into the ground more easily because of its wedge-like formation.

In use, the post 10 is first driven into the ground to the required depth. The base plate 15 is then slid downwardly over the top of post 10 with its flat side against the flat side or bar 11 of the latter and with its flanges 16 and 16' slidingly engaging the edges 18 and 18' of said bar 11. The said plate 15 may be slid downwardly until it rests with its narrower end upon the ground, whereupon a driving sledge or other similar implement may be employed to force it into the ground. It may be left with its upper edge flush with the ground surface, or may be driven to a greater depth by the use of suitable tools.

In the modified form of my invention as shown in Fig. 5 and Fig. 6, the rib 12 is provided with the spaced anchor pins 19 and 19'. A base plate 20 is a section of angle iron having two tapered leaves 21 and 22 integrally joined at right angles. The leaf 21 is slotted centrally and longitudinally at 23 to freely engage the anchor pins 19 and 19'. The slot 23 is enlarged at 24 and 24' to admit the heads of the anchor pins 19 and 19'.

In use, the post 10 is first driven into the ground, after which the base plate 20 may be applied and driven into the ground until the pin 19 impinges the upper limit of the slot 23.

It is to be understood that the invention is capable of various modifications without departing from the spirit of the invention or the scope of the appended claim.

Having thus described my invention, what I claim as new and desire to secure by Letters Patent of the United States, is:

A fence-post and base plate comprising a main T angle member, spaced pins disposed above the ground line on said member, enlarged heads on said pins, an angle member comprised of two triangular wings, spaced apertures in said member to admit the heads of said pins, aligned slots communicating with said apertures extending upwardly therefrom, whereby said angle member may be slidingly engaged with said T angle member and driven into the ground to reinforce the latter.

EMIL G. SCHULTZ.